INVENTORS.
IRVIN G. DETRA &
PAUL E. CARLSON
BY Brumbaugh, Graves, Donohue & Raymond
their ATTORNEYS

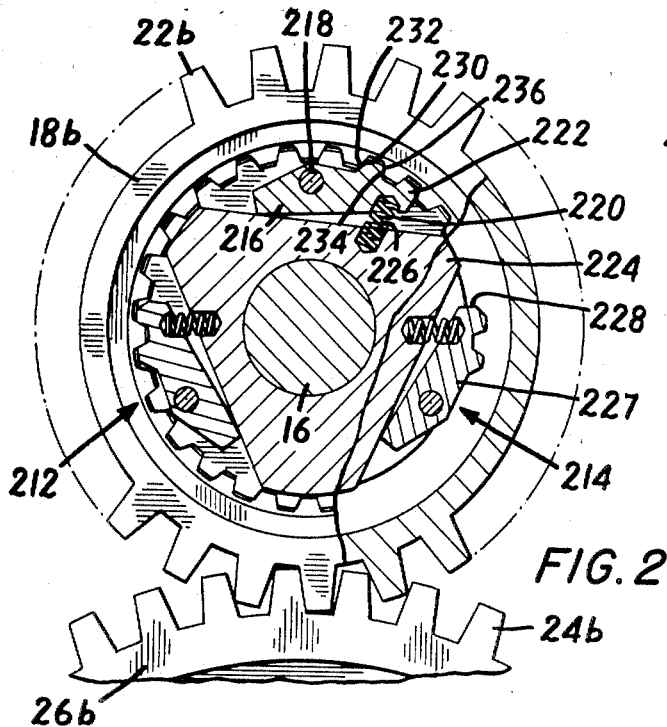
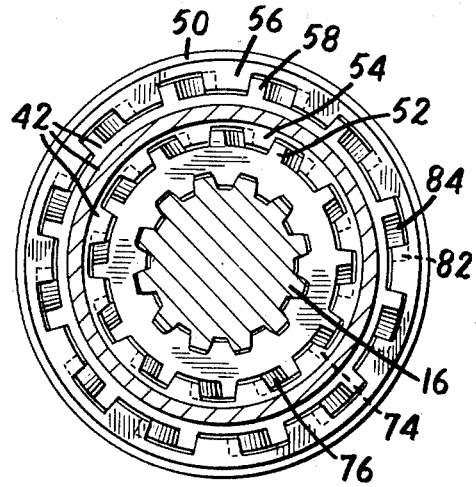
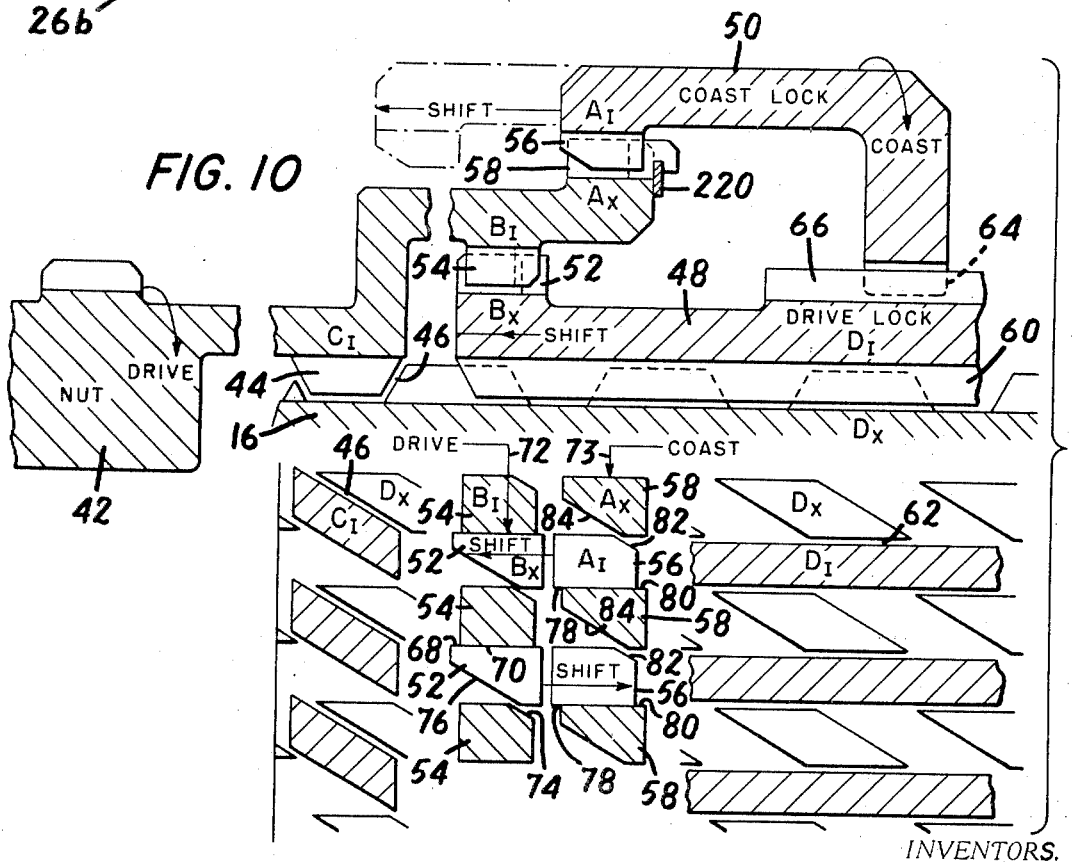

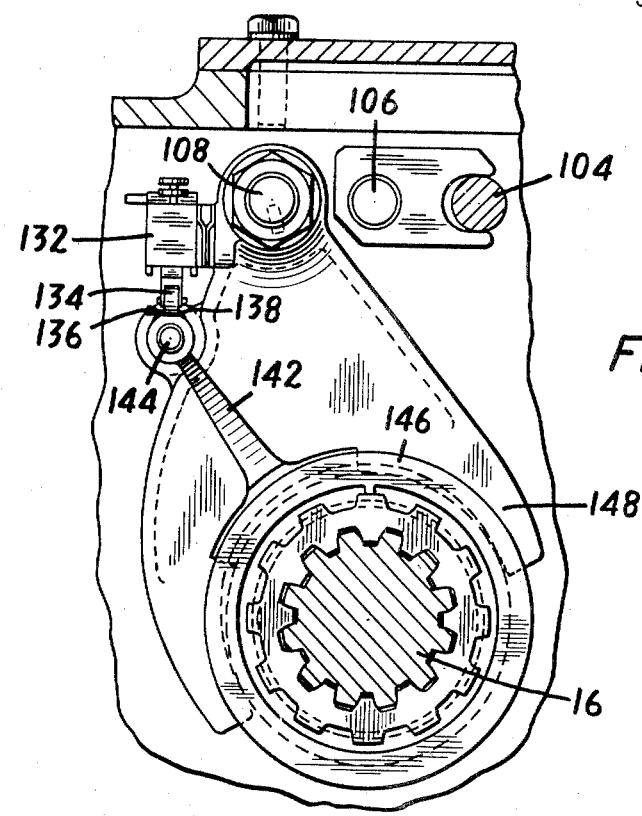
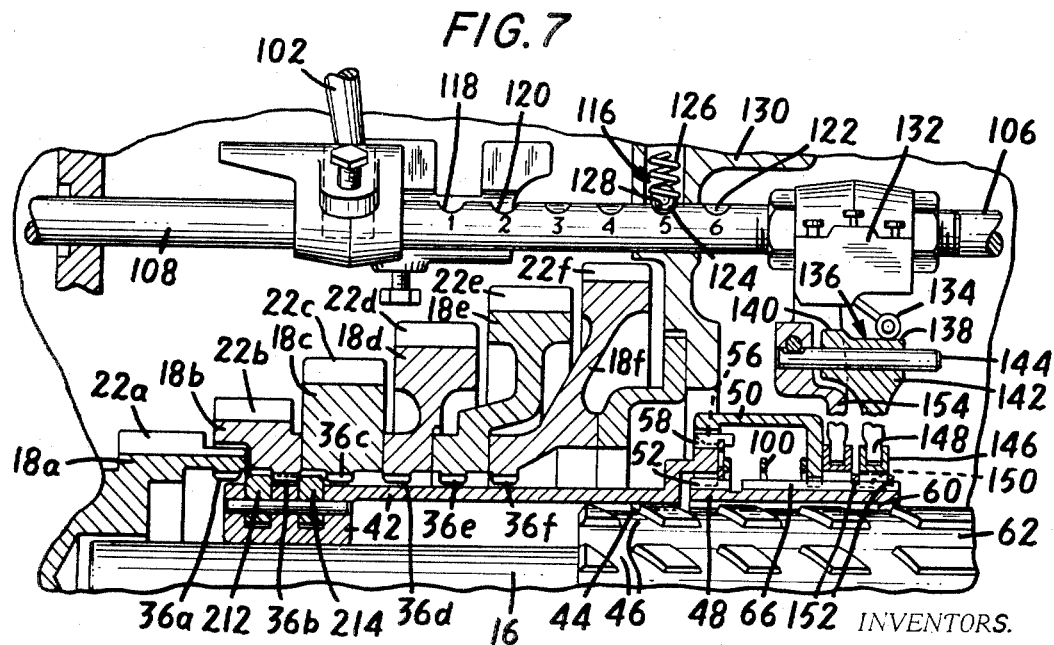

Sept. 8, 1970     I. G. DETRA ET AL     3,527,113

SELF-SHIFTING TRANSMISSION

Filed Nov. 26, 1968     5 Sheets-Sheet 4

INVENTORS.
IRVIN G. DETRA &
PAUL E. CARLSON

BY Brumbaugh, Graves, Donohue & Raymond their ATTORNEYS

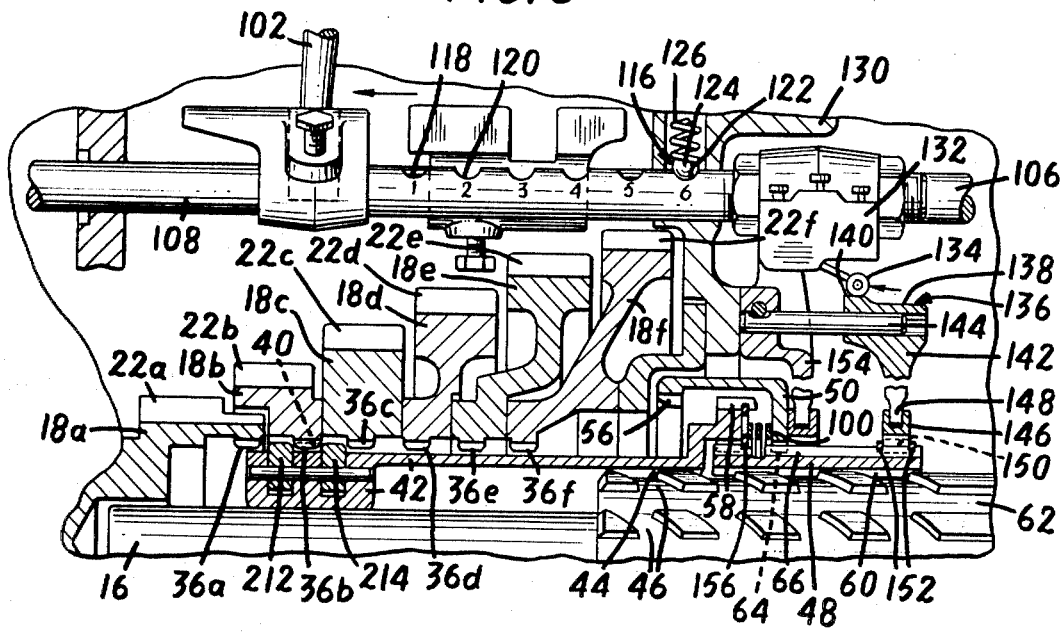
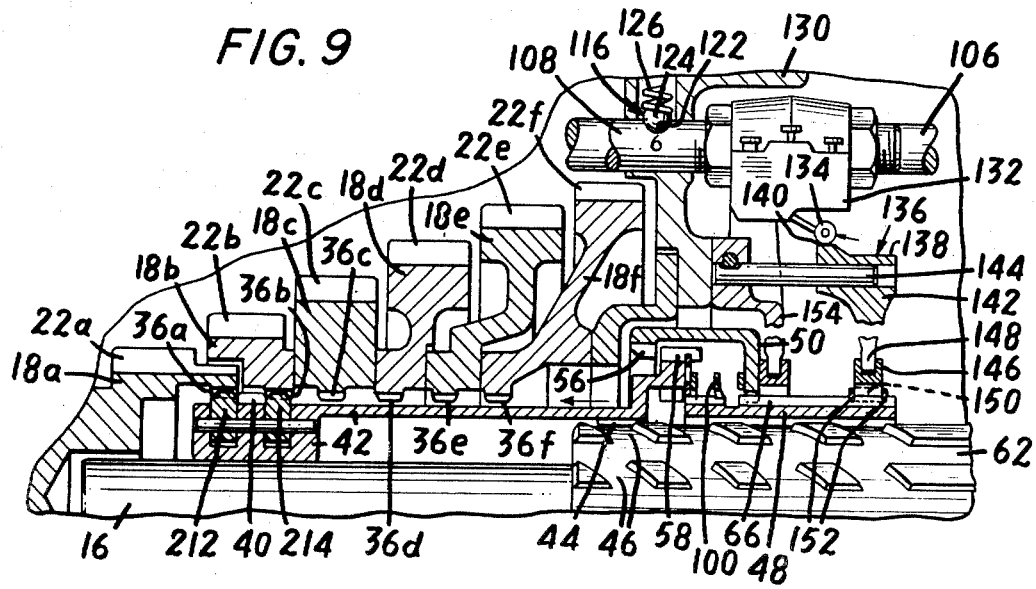

United States Patent Office 3,527,113
Patented Sept. 8, 1970

3,527,113
SELF-SHIFTING TRANSMISSION
Irvin G. Detra, Mertztown, Pa., and Paul E. Carlson, Williamsport, Md., assignors to Mack Trucks, Inc., Allentown, Pa., a corporation of New York
Filed Nov. 26, 1968, Ser. No. 779,021
Int. Cl. F16h 3/08, 3/38, 5/52
U.S. Cl. 74—371        5 Claims

ABSTRACT OF THE DISCLOSURE

A self-shifting transmission has a rotatable input shaft and a rotatable output shaft. The output shaft is formed with axial threads or splines and, along a portion thereof, with helical threads or grooves cut into the axial splines. The input shaft drives a direct-drive gear and a plurality of low-ratio gears. A shift member rotatable with the output shaft is formed with helical threads engaging the helical grooves of the output shaft, so that torque therebetween tends to shift the shift member helically along the output shaft. Drive lock teeth and coast lock teeth are formed on the shift member. A drive lock is engageable with the drive lock teeth, and a coast lock is engageable with the coast lock teeth. The drive and coast locks are movable axially along the output shaft for engagement with and disengagement from the shift member. When engaged by the shift member, they transmit, respectively, drive torque from the shift member to the output shaft and coast torque from the output shaft to the shift member. The transmission is shifted, under conditions established by an operator, between (a) a high-gear position in which it engages the direct-drive gear, (b) a plurality of lower-gear positions in which it engages one of the reduction gears, and (c) a plurality of neutral positions interspersed among the high-gear and lower-gear positions in which it is disengaged from the direct-drive and reduction gears.

CROSS REFERENCE TO RELATED APPLICATION

This is an improvement of an invention disclosed in an application of Irvin G. Detra, Ser. No. 755,558, filed Aug. 27, 1968, for "Self-Shifting Transmission."

BACKGROUND OF THE INVENTION

This invention relates to transmissions and, more particularly, to a novel and highly effective self-shifting transmission particularly adapted for use on large trucks and the like.

The transmission of an automotive vehicle such as a truck transmits power from the engine to the load with a mechanical advantage that is variable. When accelerating from a low speed and particularly from a standstill, when climbing a steep hill, particularly at low speed, and when pulling a heavy load, it is desirable and sometimes necessary to use a gear that is relatively "low." As speed increases and acceleration, load and grade decrease, it becomes possible and, for reasons of economy, desirable to use gears that are progressively "higher."

In vehicles intended for heavy service, such as large trucks and the like, the requirement for frequent shifting becomes onerous. Conventional transmissions for large trucks and the like are not typically self-shifting; that is, it is necessary for the operator to effect the shift manually. Moreover, in the operation of conventional transmissions, it is necessary to disengage and re-engage the transmission clutch one or more times. Conventional transmissions are difficult to shift because of the need to synchronize the clutching members being connected to change the transmission ratio. As a result, parts are often difficult to engage, are engaged gratingly and noisily, and are unnecessarily worn and sometimes damaged by drivers lacking skill or patience. Further, conventional transmissions typically consist of a large number of parts and are expensive to manufacture and repair. In addition, their construction tends to be heavy and bulky.

SUMMARY OF THE INVENTION

An object of the present invention is to remedy the shortcomings of conventional transmissions outlined above. In particular, an object of the invention is to provide a transmission that is self-shifting in response to operation of control means by an operator or driver and that senses synchronous rotation of engaging members to effect a shift rapidly without objectionable noise, wear or damage by an operator of limited skills and patience. A further object of the invention is to provide a transmission that can be operated independently of the disengagement of the transmission clutch. Another object of the invention is to provide a transmission that is compact and inexpensive to manufacture and repair yet extremely rugged and adapted to give long life under severe operating conditions.

The foregoing and other objects of the invention are attained, in a representative embodiment thereof, by the provision of a rotatable input shaft, a rotatable output shaft formed with axial threads or splines and, along a portion thereof, with helical threads or grooves cut into the axial splines, and a direct-drive gear and a plurality of reduction gears driven by the input shaft. A shift member rotatable with the output shaft and formed with helical threads engaging the helical grooves of the output shaft is provided, so that torque therebetween tends to shift the shift member helically along the output shaft. Drive-lock teeth and coast-lock teeth are formed on the shift member. A drive lock is engageable with the drive-lock teeth, and a coast lock is engageable with the coast-lock teeth. The drive and coast locks are formed with axial threads or splines permitting axial movement of the drive and coast locks along the output shaft for engagement with and disengagement from the shift member and preventing rotation of the drive and coast locks with respect to the output shaft. When engaged with the shift member, the drive and coast locks transmit, respectively, drive torque from the shift member to the output shaft and coast torque from the output shaft to the shift member.

The shift member is movable in response to torque between it and the output shaft, upon disengagement of at least one of drive and coast locks from the shift member, between (a) a high-gear position in which it engages the direct-drive gear, (b) a plurality of lower-gear positions in which it engages one of the reduction gears, and (c) a plurality of neutral positions interspersed among the high-gear and lower-gear positions in which it is disengaged from the direct-drive and reduction gears.

A pair of oppositely-oriented ratchets is mounted on the shift member to permit overrunning of the shift member by one of two adjacent gears in one direction only and overrunning of the shift member by the other of the two adjacent gears in the other direction only so that, when the shift member is in one of the neutral positions, the rotational speed of the shift member cannot be greater than the rotational speed of the gear providing the higher ratio nor less than the rotational speed of the gear providing the lower ratio.

Motive means is provided for disengaging one of the locks from the shift member when the shift member is in a given gear position, thereby permitting the shift member to become disengaged from the other of the locks, and positioning the first-named lock to permit the shift member to move to the next adjacent gear position. Biasing means responsive to such movement of the shift member is provided for moving the other lock to re-establish engagement between the shift member and the other lock at the new position of the shift member.

The motive means includes shift blocks, a collar and fork, a shift rail, linking rods, and a manually-engageable hand lever. A shift brake means is provided to hasten synchronization of the rotating parts, and control means is provided for applying and releasing the brake means.

BRIEF DESCRIPTION OF THE DRAWING

An understanding of additional aspects of the invention may be gained from a consideration of the following detailed description of a representative embodiment thereof, taken in conjunction with the accompanying figures of the drawing, in which:

FIG. 2 is a view along the line 2—2 of FIG. 1, looking in the direction of the arrows;

FIG. 3 is a view along the line 3—3 of FIG. 1, looking in the direction of the arrows;

FIG. 4 is a view along the line 4—4 of FIG. 1, looking in the direction of the arrows;

FIGS. 7–9 are fragmentary axial views, partly in section, of the transmission of the invention in three different conditions; and FIG. 10 is a developed plan view of a portion of the apparatus of the invention.

DESCRIPTION OF THE PREFERRED EMBODIMENTS

Figure 1:
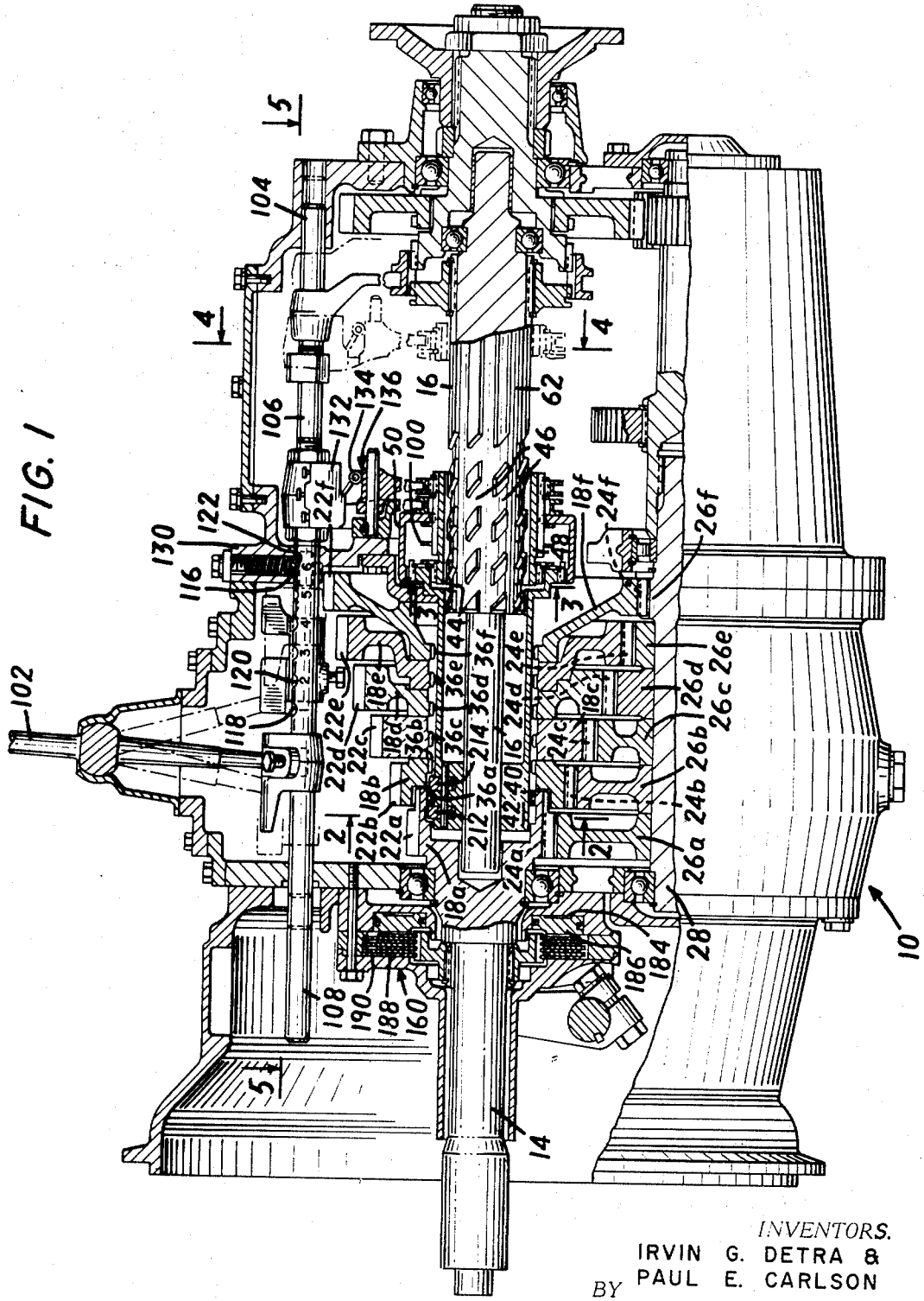
FIG. 1 is an axial view, partly in section, of a representative transmission in accordance with the invention.

FIG. 1 shows a transmission 10 constructed in accordance with the invention. The transmission 10 may be used wherever it is desired to transmit mechanical energy from a power source to a load with variable mechanical advantage. The transmission is particularly adapted to be mounted in a large truck or similar heavy-duty vehicle.

In the illustrated embodiment, a rotatable input shaft 14 drives a rotatable output shaft 16 at one of a number of speeds, depending upon which of gears 18a, 18b, 18c, 18d, 18e, and 18f (which are driven at different speeds by the input shaft 14) is engaged with the output shaft 16.

The gear 18a is a high-ratio, direct-drive gear, while the gears 18b–18f are reduction gears of progressively lower ratio. The gear 18a is formed with teeth 22a which engage teeth 24a of a reduction gear 26a mounted fast on a countershift 28. Two or more countershafts are provided to split the load and reduce tooth loads. This permits a reduction in gear face width and a shortened overall length. The reduction gear 26a is of somewhat greater diameter than the direct-drive gear 18a. Additional reduction gears 26b, 26c, 26d, 26e, and 26f, having diameters progressively smaller than the diameter of the reduction gears 26a, are also mounted fast on the countershaft 28.

The reduction gears 26b–26f are formed with teeth 24b, 24c, 24d, 24e, and 24f, respectively, which engage teeth 22b, 22c, 22d, 22e, and 22f, respectively, of the gears 18b, 18c, 18d, 18e, and 18f. The gears 18b–18f have diameters progressively greater than that of the gear 18a.

When the direct-drive gear 18a is driven by the input shaft 14, it turns with angular and tangential velocities which depend on the speed with which the input shaft 14 turns; the reduction gear 26a, being peripherally engaged with direct-drive gear 18a and having a somewhat greater diameter than the direct-drive gear 18a, turns with a tangential velocity equal to that of the direct-drive gear 18a and an angular velocity somewhat less than that of the direct-drive gear 18a. The reduction gears 26b, 26c, 26d, 26e, and 26f turn with an angular velocity equal to that of the reduction gear 26a and tangential velocities progressively less than that of the reduction gear 26a. The gears 18b–18f, being peripherally engaged with the reduction gears 26b–26f and having progressively greater diameters turn with progressively slower angular velocities.

The gears 18a–18f are formed with clutch teeth 36a, 36b, 36c, 36d, 36e, and 36f, respectively. The clutch teeth 36a–36f are disposed in circles of equal diameter, face inwardly with respect to the common axis of the gears, and rotate about the common axis at progressively slower speeds, the clutch teeth 36a moving at the greatest rate and the clutch teeth 36f at the slowest.

Neutral gear being disregarded for the moment, the transmission 10 is in first, second, third, fourth, fifth or sixth gear depending upon whether the clutch teeth 40 of a shift member 42 engage the clutch teeth 36f, 36e, 36d, 36c, 36b, or 36a. In oredr to shift from one gear to another, it is therefore necessary to displace the shift member 42 axially along the output shaft 16 to the left (upshift) or right (downshift) as seen in FIG. 1.

To facilitate such shifting movemet of the shift member 42, the shift member 42 is formed with helical threads 44 which engage helical threads or grooves 46 formed on a portion of the output shaft 16. Torque between the output shaft 16 and the shift member 42 tends to displace the shift member 42 helically along the output shaft 16: that is, to translate the shift member 42 along the axis of the output shaft 16 while simultaneously rotating the shift member 42 with respect to the output shaft 16.

The direction of the displacement depends on the direction of the torque and the direction of winding of the threads 44 and grooves 46. If the input shaft 14 rotates clockwise as viewed from a position in front of the engine, the gears 18a–18f, shift member 42, and output shaft 16 all rotate clockwise as viewed from a position at the left of FIG. 1. Then, if the helical threads 44 and grooves 46 extend from lower right to upper left as seen in FIG. 1, drive torque between the shift member 42 and the output shaft 16 tends to move the shift member 42 to the right as seen in FIG. 1, and coast torque transmitted from the output shaft 16 to the shift member 42 by way of the helical grooves 46 and helical threads 44 tends to move the shift member 42 to the left as seen in FIG. 1.

Thus, the reaction between the engaging portions of the shift member 42 and the output shaft 16 serves to facilitate a shift of gears, provided the shift member 42 is not prevented from shifting by means now to be described.

As FIG. 10 shows, the shift member 42 can be held stably in the first, second, third, fourth, fifth, or sixth gear position by a pair of movable locks 48 and 50. The lock 48 is a drive lock and, when engaged with the shift member 42, transmits drive torque from the shift member 42 to the output shaft 16. The lock teeth 52 and 54 formed on the drive lock 48 and shift member 42, respectively, are so formed that coast torque is not transmitted by the drive lock 48 to the shift member 42.

The coast lock 50, when it is engaged with the shift member 42, transmits coast torque from the coast lock 50 to the shift member 42. The lock teeth 56 and 58 formed on the coast lock 50 and shift member 42, respectively, are so formed that drive torque is not transmitted from the shift member 42 to the coast lock 50.

The drive lock 48 is formed with axial threads, keys or splines 60 that engage axial threads or splines 62 formed on the output shaft 16 so that the drive lock can be moved axially of the output shaft 16 and is constrained to rotate with the output shaft 16 but cannot be rotated with respect to the ouput shaf 16.

The coast lock 50 is formed with axial threads or splines 64 that engage axial threads or splines 66 formed on the outer circumference of the drive lock 48 so that the coast lock 50 likewise is movable axially of the output shaft 16 and constrained to rotate with the output shaft 16 but cannot be rotated with respect to the output shaft 16.

FIGS. 3 and 10 show in detail the structure of the lock teeth 52, 54, 56, and 58 by virtue of which opposed pairs of lock teeth transmit torque in one direction only.

In FIG. 10, the lock teeth 52, 54, are represented as offset axially in a forward direction with respect to the lock teeth 56, 58, in order to show simultaneously the structure of both sets of teeth. As FIG. 1 shows, the lock teeth are actually at the same axial co-ordinate in the preferred embodiment of the invention.

The drive lock teeth 52, 54 are formed with engaging surfaces 68, 70, respectively, which extend axially substantially in a plane containing the axis of the shift member 42 and drive lock 48. Accordingly, when the lock teeth 54 move in a direction indicated by the arrow 72 (the clockwise direction as viewed from a position to the left of FIGS. 1 and 10, or as viewed from the front of the transmission), the teeth 52 and hence the drive lock 48 and output shaft 16 are forced to rotate in the same (clockwise) direction. On the other hand, when the direction of movement of the teeth 54 is reversed (with respect to the teeth 52), beveled portions 74 of the teeth 54 are opposed to complementally bevelled portions 76 of the teeth 52. The inclination of these surfaces with respect to the axis of the drive lock 48 and shift member 42 is the same as the inclination of the engaging surfaces of the segments DX and CI forming the helical grooves 46 and threads 44. Accordingly, the drive lock teeth 52 and 54 permit the shift member 42 to rotate counterclockwise (as viewed from the left of FIG. 1) with respect to the output shaft 16 and advance to the left (as seen in FIG. 1), unless such shifting movement of the shift member 42 is prevented by engagement of the coast lock teeth 56 and 58.

As FIG. 10 also shows, the coast lock teeth 56 and 58 are similar to the drive lock teeth 52 and 54, except that the locations of the axial and bevelled surfaces are relatively reversed. Specifically, in the case of the coast lock teeth 56 and 58, axial surfaces 78 and 80 are engageable so that, if the teeth 56 are driven by coast forces in the direction of arrow 73, the teeth 56 force the teeth 58 to move clockwise as seen from the left of FIG. 1. On the other hand, drive torque is not transmitted from the shift member 42 to the coast lock 50, because beveled surfaces 82 and 84 formed on the teeth 56 and 58, respectively, permit the shift member 42 to move to the right (as seen in FIG. 1) in response to reaction between the shift member 42 and the output shaft 16, unless the drive lock teeth 52 and 54 are engaged.

In order to change speed ratios, it is necessary to disengage one of the locks 48 and 50 from the shift member 42. For an upshift, the coast lock 50 is moved axially to the left by motive means described in detail hereinafter. This permits the shift member 42 to move by coast reaction to the left along a helical path, and, following the completion of such movement of the shift member 42 to the next higher gear position, the drive lock 48 is moved to the left automatically by a spring 100 the operation of which is described in detail below to lock the shift member 42 in such position. In a downshift, it is the drive lock 48 that is first advanced (to the right) to the next lower gear position, whereupon the shift member 42 moves by drive reaction to the right along a helical path, and, finally, the coast lock 50 is moved automatically by the spring 100 to the right to lock the shift member 42 in the selected gear position.

The shifting of the drive or coast lock 48 or 50 to initiate a shift of gears is effected by manual actuation of a shift lever 102. The operation of the shift lever may be understood from a study of an application of Delbert E. Willis Ser. No. 715,778, filed Mar. 25, 1968, for "Vehicle Transmission Shifting Apparatus" and need not be described in detail here. The operation of the lever 102 is summarized for convenience, however, reference being made to FIGS. 1 and 5. The lower end of the lever 102 (FIG. 1) is adapted to engage any one of shift rails 104, 106, and 108 (FIG. 5), but interlocks are provided to prevent the shift lever 102 from moving from engagement with the rail 104 to engagement with the rail 106 except when the rail 104 is in the forward position and to prevent the shift lever 102 from moving from engagement with the rail 106 to engagement with the rail 104 except when the transmission is in first gear. Further, interlocking means is provided for preventing the lever 102 from moving from engagement with one of the rails 106 and 108 to the other of such rails except when the transmission is in fourth gear.

Figure 5:
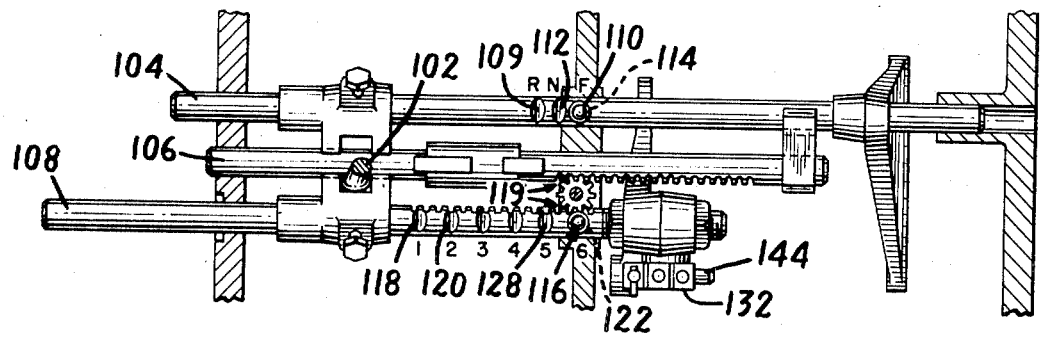
FIG. 5 is a view along the line 5—5 of FIG. 1, looking in the direction of the arrows.

Thus, in shifting through the gears from reverse through neutral and then through first through sixth gears, the rail 104 is moved from a position in which a reverse notch 109 is aligned with detent means including a spring-biased ball 110, thus holding the rail 104 in the reverse-gear position, to a position in which a notch 112 is aligned with the detent means 110 to hold the rail 104 in the neutral-gear position, to the position illustrated in FIG. 5, in which the detent means 110 enters a recess 114 formed on the rail 104. This is the forward gear position, and from this position the lever 102 can be moved laterally from engagement with the rail 104 to engagement with the rail 106. The rail 106 is in the first-gear position, detent means 116 being aligned with a notch 118 formed on the rail 108. From this position, the shift lever 102 can move the shift rail 106 rearwardly (to the right as seen in FIG. 5), and, by virtue of a rack and pinion connection 119 between the rails 106 and 108, the rail 108 is at the same time advanced forwardly (to the left as seen in FIG. 5) until the detent means 116 engages a notch 120 formed in the rail 108.

The transmission is then in second gear, and it can be advanced in a similar manner to fourth gear. In the fourth-gear position, the lever 102 can be moved laterally again from engagement with the rail 106 to engagement with the rail 108. The shift lever is then moved, in shifting to fifth and sixth gears, in a direction opposite to the direction in which it is moved in shifting from first to fourth gears. In sixth gear, the detent means 116 is aligned with and enters a notch 122, as shown in FIG. 5.

Movement of the shift lever 102 through the gears as described above is effective to move the drive and coast locks 48 and 50 to facilitate shifting of the shift member 42. FIGS. 7, 8, 9, and 1 illustrate successive steps in a shift from fifth gear to sixth gear.

FIG. 7 shows the transmission in fifth gear. The rail 108 is held in the fifth-gear position by the detent means 116, which includes a ball 124 biased by a spring 126 to enter a recess 128. A support member 130 integral with the transmission casing holds the detent means 116 stationary, and the rail 108 is therefore also held stationary in the illustrated gear position.

A switch 132 is attached to and movable with the rail 108 and is provided with a pivotally-mounted cam follower 134 which is biased to ride on a cam surface 136. The cam surface 136 includes a low portion 138 and a high portion 140. When the cam follower is on the low portion 138 the switch 132 is open, and, when the cam follower 134 is on the high portion 140 of the cam surface 136, the switch 132 is closed. The cam surface 136 is formed on the arm 142 slideably supported at one end on a rod 144 and, at the other end 148, in a grooved annular flange 146 which, by virtue of teeth 150 engaging the axial splines 66 of the drive lock 48, rotates with the output shaft 16. The annular grooved flange 146 is prevented from moving axially with respect to the splines 66 and hence with respect to the drive lock 48 by rings 152 secured to the splines 66.

In moving from fifth gear to sixth gear, the rail 108 is moved forwardly (to the left as seen in FIGS. 7 and 8) until the detent means 116 engages the slot 122, as shown in FIG. 8. This moves an arm 154, in which the rod 144 is anchored at the left end and which is rigidly connected to the shift rail 108 as well as to the switch 132, to the left, disengaging the coast lock 50 from the shift member 42, so that coast torque cannot be transmitted from the output shaft 16 through the axial splines 60, the drive lock 48, the axial splines 66, the teeth 64, the coast lock 50, and the shift member 42. This places the spring 100 under compression, inasmuch as the spring is retained between a ring 156 secured to the splines 66 of the drive lock 48 and the coast lock 50.

At the same time, the cam follower 134 rides to the high portion 140 of the cam surface 136, thus closing the switch 132.

Figure 6:
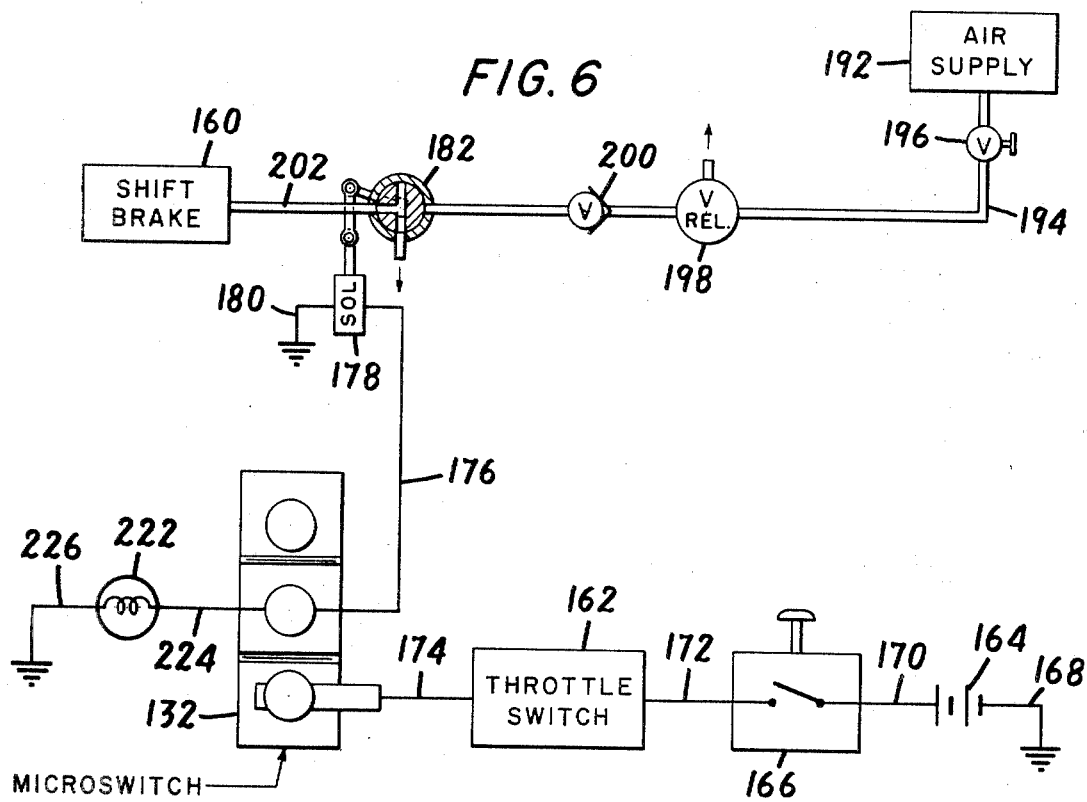
FIG. 6 is a schematic representation of a portion of control apparatus according to the invention.

The closing of the switch 132 is effective to set a shift brake 160 (FIGS. 1 and 6) when the driver removes his foot from the accelerator pedal, thus closing a throttle switch 162 and completing a circuit from a battery 164 through a reset switch 166, which is normally closed.

Completion of a circuit from ground through a line 168, the battery 164, a line 170, the reset switch 166, a line 172, the throttle switch 162, a line 174, the switch 132, a line 176, a solenoid 178, a line 180, and back to ground energizes the solenoid 178. The solenoid 178 is connected to a multiple position air valve 182. The multiple position air valve 182 controls the flow of air to a cylinder 184 fitted with a piston 186 movable to the left (FIG. 1) to force braking elements 188 and 190 tightly together to slow the input shaft 14. One set of elements 188, 190 rotates with the shaft 14, and the other is stationary with respect to the transmission casing.

Air is supplied from a source 192, which may be a tank of compressed air or compressed air generated by an engine-driven compressor. The air flows through a line 194 provided with a shut-off valve 196, a release valve 198, and a check valve 200. Other braking means may be provided, employing, for example, a hydraulic fluid.

The valve 182 is biased by a spring or other suitable means so that, when the solenoid 178 is not actuated, the valve 182 prevents communication between the line 194 and a line 202 connected to the shift brake 160. When the solenoid 178 is actuated, it modifies the state of the valve 182 to establish communication between the line 194 and the line 202, whereupon air is supplied to the shift brake 160 to apply the brake.

Accordingly, in the position of FIG. 8, in which the cam follower 134 closes the switch 132, the brake 160 is set when the operator closes the throttle switch 162 by removing his foot from the accelerator pedal.

The slowing of the input shaft 14, while the output shaft 16 continues to rotate at substantially constant speed because of inertia, tends to develop a coast torque between the output shaft 16 and shift member 42. Inasmuch, however, as the coast lock 50 has been disengaged from the shift member 42, the coast torque cannot be transmitted from the output shaft 16 through the coast lock 50 to the shift member 42. The torque tends to be transmitted from the output shaft 16 through the helical grooves 46 and threads 44 by which the output shaft 16 engages the shift member 42, but no appreciable torque can be transmitted through this route, in view of the helical formation of the splines and grooves 44, 46. Accordingly, the shift member 42 shifts axially to the left to a neutral position as shown in FIG. 9, while rotating counterclockwise as seen from a position to the left of FIG. 9 so that the clutch teeth 36b and 40 become disengaged.

The position shown in FIG. 9 is a neutral position at which oppositely-directed synchronizing ratchets 212 and 214 are simultaneously opposed to clutch teeth 36a and 36b.

FIG. 2 shows the synchronizing ratchets 212 and 214 in greater detail. The ratchet 212 includes one or more ratchet pawls 216 pivotable on studs 218 and urged in a counterclockwise direction (as seen in FIG. 2) by biasing means such as a compression coil spring 220 bearing at one end against an end 222 of the ratchet pawl 216 and at the other end against the generally triangular section 224 of the shift member 42 within which a recess 226 is formed for receiving the spring 220.

The ratchet 214 is similar to the ratchet 212 except that its ratchet pawls 227 are mounted in the reverse direction: that is, it is the counterclockwise ends 228 (as seen in FIG. 2) rather than the clockwise ends of the ratchet pawls 227 that are biased outwardly with respect to the ratchet axis.

The ratchet 212 thus permits overrunning by any of the clutch teeth 36a–36e to which it may be opposed when such opposed clutch teeth turn clockwise (from the perspective of FIG. 2) with respect to the ratchet 212, for in such case a straight line between the pivot formed by the stud 218 and the engaging surfaces 230 and 232 of such clutch teeth and the ratchet pawl 216, respectively, forms an acute angle with those surfaces. On the other hand, the ratchet 212 does not permit rotation of the clutch teeth in a counterclockwise direction (from the perspective of FIG. 2) with respect to the ratchet 212, inasmuch as the engaging surfaces 234 and 236 of the clutch teeth and ratchet pawls 216, respectively, are approximately at right angles to a line between the pivot formed by the stud 218 and those surfaces.

Similarly, the ratchet 214 permits overrunning thereof by any of the clutch teeth 36b–36f to which it may be opposed in a counterclockwise direction (as seen in FIG. 2) but not in a clockwise direction.

When, during an upshift from fifth to sixth gear, the shift member 42 initially shifts to a position such that the ratchets 212 and 214 are opposed to the clutch teeth 36a and 36b, respectively, the ratchets 212 and 214 have initially substantially the same rotational speed as the gear 18b, inasmuch as the clutch teeth 36b and 40 have just been disengaged. The gear 36a always turns faster than the gear 36b when the engine is running; and the gear 36a thus initially overruns the ratchet 212 in a clockwise direction (as seen in FIG. 2).

With the ratchets 212 and 214 opposed to the clutch teeth 36a and 36b, respectively, as in FIG. 4, both ratchets are overrun so long as the rotational speed of the ratchets is intermediate the rotational speeds of the gear 18a and the gear 18b. The transmission is then in neutral (to be distinguished from the neutral position 112 shown in FIG. 5), and the reaction between the shift member 42 and the output shaft 16 through the helical threads and grooves 44 and 46 disappears until a further reaction occurs because of synchronization of the ratchets 212 and 214 with the clutch teeth 36a. Such synchronization is hastened by application of the brake 160, as noted above.

Further slowing of the gear 18a produces a reaction between the shift member 42 and the output shaft 16 by virtue of which the shift member 42 moves again helically to the left (as seen in FIG. 1) and counterclockwise with respect to the output shaft 16 (as seen in FIG. 2). The shift member 42 is brought in this fashion to the position shown in FIG. 1, in which the clutch teeth 36a formed on the gear 18a engage the clutch teeth 40 formed on the shift member 42.

The drive and coast locks 48 and 50 have their lock teeth 52 and 56 so aligned with the lock teeth 54 and 58, respectively, that they engage the shift member 42 only at spaced full-torque-transmitting stations, where the clutch teeth 40 fully engage the clutch teeth 36a, 36b, 36c, 36d, 36e, or 36f. During the upshift, when the shift member 42 is accurately positioned as shown in FIG. 1, the alignment of the lock teeth 52 and 54 is such that the compression spring 100 then causes the drive lock 48 to follow up and snap into engagement with the shift member 42 and prevent it from backing off when load reversal occurs. Thus the shift member 42 is locked in its new torque-transmitting station (sixth gear) and will not move out of this station until the drive lock is inentionally disengaged to facilitate a downshift.

When the vehicle slows to the extent that the driver anticipates the need for a downshift from sixth to fifth gear, he manipulates the shift lever 102 in such a manner as to bring the shift rail 108 to the position shown in FIG. 7. This moves both of the arms 142 and 154 to the right, to the position shown in FIG. 7, inasmuch as the arm 154 is integral with the rail 108 and the annular flange in which it rides abuts the keeper 152 between such flange and the annular flange 146 in which the arm 142 rides.

The movement of the flange 146 means that the drive lock 48 also moves to the right one station, inasmuch as the keepers 152 are affixed to the axial splines 66 formed on the drive lock 48. This disengages the drive lock 48 from the shift member 42 so that drive torque is no longer transmitted from the shift member 42 to the drive lock 48. On the contrary, drive torque established by accelerating the engine to a speed greater than the road speed of the vehicle causes the shift member 42 to shift helically to the right along the grooves 46. Although the spring 100 is under compression, the coast lock 50 cannot immediately follow to the right, because of a flange 220 formed on the shift member 42 (FIG. 10). When the shift member 42 moves, it turns about its axis with respect to the output shaft 16, so that the coast lock teeth 56 and 58 are no longer aligned. Thus the coast lock 50 cannot follow up the movement of the shift member 42 initially. The shift member accordingly moves to the neutral position illustrated in FIG. 9, whereupon synchronization takes place in the manner described previously except in an opposite sense: that is, initially, the ratchet 212 is moving at the same speed as the clutch teeth 36a, because the clutch teeth 36a and 40 have just become disengaged. The ratchet 214 initially runs faster than the clutch teeth 36b to which it is opposed. The clutch teeth 36b are speeded up by opening the throttle, and reaction between the shift member and the output shaft 16 disappears until the ratchet 214 and the clutch teeth 36b become synchronized. Thereupon, a reaction is generated between the helical threads and the grooves 44, 46, which advances the shift member to the right until the clutch teeth 40 are opposed to the clutch teeth 36b, as shown in FIG. 8.

At this point, the locking teeth 56 and 58 are aligned so that the spring 100 can force the coast lock 50 to follow-up and lock the transmission in fifth gear so that the transmission will stay in that gear when torque reversal occurs.

The description set forth above of an upshift from fifth to sixth gear and a downshift from sixth to fifth gear of course applies also to shifting from any one of the gears to the next adjacent gear.

It will be noted that the brake is not applied during the downshift, since the switch 132, the cam follower 134, and the cam surface 136 move simultaneously to the right when a downshift is initiated. The cam follower 134 remains on the low portion 138 of the cam surface 136, thus preventing undesired application of the brake 160.

When the switch 132 closes on an upshift, a dash-mounted light 222 connected to the switch 132 by a line 224 and to ground by a line 226 is provided to indicate to the driver that the shift brake 160 is applied.

Thus there is provided in accordance with the invention a novel and highly-effective transmission which is extremely compact and rugged and economical to manufacture and repair and which is self-shifting in response to the control of an operator.

Many modifications in form and detail within the spirit and scope of the invention will readily occur to those skilled in the art. Accordingly, the invention is to be construed as including all of the modifications thereof with the scope of the appended claims.

We claim:

1. A self-shifting transmission comprising a rotatable input shaft; a rotatable output shaft formed with axial and helical threads; a direct-drive gear and a plurality of reduction gears driven by said input shaft; a shift member rotatable with said output shaft and formed with helical threads engaging the helical threads of said output shaft, so that torque therebetween tends to shift said shift member helically along said output shaft; drive-lock teeth and coast-lock teeth formed on said shift member; a drive lock engageable with said drive-lock teeth; and a coast lock engageable with said coast-lock teeth, said drive and coast locks (a) being formed with axial threads permitting axial movement of said drive and coast locks along said output shaft for engagement with and disengagement from said shift member and preventing rotation of said drive and coast locks with respect to the axial threads of said output shaft and (b) when engaged with said shift member, transmitting, respectively, drive torque from said shift member to said output shaft and coast torque from said output shaft to said shift member, said shift member being movable in response to torque between it and said output shaft, upon disengagement of at least one of said drive and coast locks from said shift member, between (a) a high-gear position in which it engages said direct-drive gear, (b) a plurality of lower-gear positions in which it engages one of said reduction gears, and (c) a plurality of neutral positions interspersed among said high-gear and lower-gear positions in which it is disengaged from said direct-drive and reduction gears.

2. A transmission according to claim 1 further comprising (a) motive means for disengaging one of said locks from said shift member when said shift member is in a given gear position, thereby permitting said shift member to become disengaged from the other of said locks, and positioning said one lock to permit said shift member to move to an adjacent gear position and (b) biasing means responsive to such movement of said shift member for moving said other lock to re-establish engagement between said shift member and said other lock at said adjacent gear position.

3. A transmission according to claim 1 further comprising a pair of ratchets mounted on said shift member, one of said ratchets being opposable to a given one of said gears and the other of said ratchets being simultaneously opposable to a gear adjacent to said given gear when said shift member is in said neutral position, said ratchets being oppositely oriented to permit overrunning of said shift member by the faster moving of said given and adjacent gears in one direction only and overrunning of said shift member by the slower moving of said given and adjacent gears in the other direction only so that, when said shift member is in said neutral position, the rotational speed of said shift member cannot be greater than the rotational speed of said faster moving gear nor slower than the rotational speed of said slower moving gear.

4. A transmission according to claim 3 further comprising brake means for slowing said input shaft while said transmission is in neutral during an upshift to synchronize said faster moving of said given and adjacent gears with the ratchet opposed thereto.

5. A transmission according to claim 4 in which said brake means is electropneumatically actuated and further comprising a brake switch for interrupting electric current to said brake means and cam means responsive to movement of said drive lock for actuating said brake switch.

References Cited

UNITED STATES PATENTS

| | | | |
|---|---|---|---|
| 1,664,303 | 3/1928 | Mayer | 74—371 X |
| 2,045,835 | 6/1936 | Coen | 74—337 |
| 2,770,979 | 11/1956 | Sinclair | 74—339 |
| 3,154,962 | 11/1964 | Mukherjee | 74—337 |

LEONARD H. GERIN, Primary Examiner

U.S. Cl. X.R.

74—337, 339, 372